United States Patent Office 2,856,302
Patented Oct. 14, 1958

2,856,302

CERAMIC MATERIALS AND SILICA SOL COMPOSITIONS FOR THE PREPARATION THEREOF

Raymond Reuter, Orland Park, Ill., assignor to National Aluminate Corporation, Chicago, Ill., a corporation of Delaware No Drawing. Application September 16, 1954
Serial No. 456,627

10 Claims. (Cl. 106—38.3)

This invention relates to new and improved ceramic materials and to new and improved silica sol compositions suitable for use in making said ceramic materials, especially refractory casting molds. The invention is particularly concerned with silica sol compositions which, when used as a vehicle and binder for refractory casting mold materials, are capable of forming uniformly controllable high strength gels that impart higher physical strengths to such refractory molds.

Aqueous silica sols have been known as binders for refractory type materials. Examples of such use is shown in U. S. Patents 2,329,589 and 2,380,945. While these aqueous sols of colloidal silica have been shown to be of some advantage as cementing and binding agents for ceramics, their use has been limited due to the fact that the gels formed by such materials have theretofore been soft and did not afford sufficient binding strength for the particles they were applied to.

Hydrolyzed organic silicates, such as ethyl silicate, form hard gels in their applications as ceramic binders, but their use is somewhat restricted since they cannot be kept very long once the organic compound has been hydrolyzed.

Production of refractory type casting molds requires a liquid vehicle and binding agent which will produce a mold that is capable of setting up under controlled conditions. Once the molds are produced, they must be uniform and have a set of physical characteristics which will enable them to withstand the conditions of handling and heat to which such molds are normally subjected in the course of foundry operations. It is therefore an object of this invention to provide a liquid vehicle for refractory casting molds capable of forming high strength gels.

Another object of the invention is to provide an aqueous vehicle for investment refractory casting molds which is capable of forming high strength gels under controlled conditions.

A further object is to provide a precoat for patterns to be used in precision investment refractory molds.

Another object of the invention is to provide an aqueous silica sol precoat for patterns to be used in precision investment refractory molds which is capable of use with or without a gel accelerator.

Still another object is to provide a vehicle and binder for refractory casting molds capable of giving a high green strength to refractory casting molds.

Still a further object is to provide a new and improved process for making refractory casting molds.

Another object is to provide a process for forming precision investment refractory casting molds. Other objects will appear hereinafter.

In accordance with the present invention new and useful aqueous silica sols are prepared having a conductivity of at least 1800 micromhos, a pH of from 8.4 to 10.0, a specific gravity of at least 1.07 and an average particle size not substantially greater than about 10 millimicrons.

The silica sols provided in accordance with the invention are especially useful for binding together ceramic particles in the manufacture of ceramic articles. They are especially advantageous, for example, when employed to make refractory molds by a process which consists in slurrying a refractory material with an aqueous silica sol produced in accordance with the invention, adding an amount of electrolyte sufficient to produce uniform controlled gelation of the silica sol, setting up the resultant mold and firing the mold.

It has been found in the practice of the invention that silica sols having the highest conductivity and the lowest pH, when these values comes from the silica only and not from impurities, are capable of producing the highest strength gels when a suitable electrolyte has been added thereto. It is preferred to produce sols having a silica concentration of between about 15 and about 18% $SiO_2$. In general, the range of conductivity of the sols made in accordance with the invention is 1800 to 3200 micromhos and the preferred conductivity range is 2000 to 3000 micromhos. The preferred pH range is 8.5 to 9.0. The general range of the weight ratio of $SiO_2$ to alkali metal oxide, expressed as $SiO_2:Na_2O$, is from about 160:1 to about 330:1 and the preferred range is from about 170:1 to about 200:1. The preferred range of specific gravities of silica sols made in accordance with the invention is from 1.105 to 1.115 at 68° F.

The following general procedure is preferably employed in making the sols of the present invention and forms a part of the invention:

(1) A dilute solution of silica sol is prepared by passing a dilute aqueous solution of an alkali metal silicate, e. g., sodium silicate, through a column composed of spherical particles of a cation exchange resin in the hydrogen form in accordance with the general procedure described in Bird, U. S. Patent 2,244,325 to produce an acid sol (e. g., having a pH of 3.5 and a conductivity of 400 to 800 micromhos).

(2) The acid sol, which is the effluent from the cation exchanger, is treated with ammonium hydroxide in an amount sufficient to adjust the pH, preferably to about 9. This sol preferably has an $SiO_2$ content of at least 2.0% and the optimum results have been obtained where the sol has an $SiO_2$ content within the range of 3.5 to 4.8%. The sol at this point is capable of being stored for relatively long periods of time without degradation or gelation. However, the pH will tend to rise on standing.

(3) In order to produce a more concentrated sol for the purpose of the invention the dilute sol containing ammonium hydroxide from step (2) is placed in an evaporating kettle and the temperature is raised until steam and ammonia vapors are first detected.

(4) At this time a quantity of a permanent alkali, preferably potassium hydroxide, is added to the sol to maintain a pH of preferably at least 9.

(5) At the same time additional quantities of the ammonium hydroxide adjusted sol from (2) are added to the sol being evaporated and this addition is continued throughout the evaporation process so that the volume of the evaporating sol is maintained substantially constant.

(6) Toward the end of the evaporation period when the desired $SiO_2$ concentration is attained, the pH is allowed to drop to about 8.5 and the evaporation is finished at this pH. If the pH is allowed to drop below about 8.4 at any time, the sol is rendered unfit for use as a binder for ceramic articles.

It is preferred to use ammonium hydroxide in maintaining the necessary alkalinity because this material is volatile and the volatilization of the ammonia makes it unlikely that the alkalinity will rise to a point where the desired physical properties of the sol are destroyed. Throughout the process a constant check on the specific gravity of the boiling liquid is maintained and for the optimum results the specific gravity should never exceed 1.115 at 68° F. It is generally desirable to discontinue the process when the specific gravity of the evaporating sol reaches about 1.110 and at this point a small amount of permanent alkali, such as potassium hydroxide, is added if needed to finish the sol at a permanent pH, preferably around 8.5.

In step (1) the concentration of the alkali metal silicate solution employed for the preparation of the dilute solution of the silica sol should be sufficiently low to avoid substantial gelation while the sol is in contact with the cation exchange resin. Any cation exchanger in the hydrogen form can be employed which is capable of exchanging hydrogen for alkali metal ions which are present in the alkali silicate solution. The best results are obtained by using synthetic resin cation exchangers of the type formed by the copolymerization of a polyvinyl aryl compound with a monovinyl aryl compound with the formed cross-linked polymer having attached to the aromatic nucleus thereof sulfonic acid groups as disclosed, for example, in U. S. Patent 2,366,007. Sulfonated polystyrene divinylbenzene copolymers (e. g., Nalcite HCR) are particularly useful. Similarly, polymerized cross-linked acrylic acid type polymers containing functional carboxylic acid groups can also be used in making the sols.

In step (3) other basic volatile substances can be employed to replace a part or all of the ammonium hydroxide, as, for example, dimethylamine, trimethylamine, diethylamine, and other volatile amine bases. In step (4) any stable alkali metal hydroxide can be substituted for the potassium hydroxide, as, for example, sodium hydroxide, in order to give permanent alkalinity to the finished sol. The sols produced as above described are suitable for use in making refractory molds or they can be diluted with water to form dilute sols. In general, the production sols have a concentration within the range of 10 to 18% $SiO_2$, preferably 16 to 17.5% $SiO_2$. The sols as they are employed in making refractory casting molds preferably have a concentration of 10 to 17.5% $SiO_2$. The specific gravity of the sols as they are used in making refractory casting molds is preferably at least 1.07 and the preferred specific gravity range is 1.07 to 1.10 at 68° F.

The $SiO_2$ concentration of the sol is extremely important in relation to the type of gels that can be produced. The sols containing from about 10 to 17.5% $SiO_2$ are capable of forming gels of high strength. Within this range it has been found that the higher the concentration of silica in the sol the stronger will be the gels. While the best gels are formed when sols contain about 10 to 17.5% of $SiO_2$, it is to be understood that dilutions as low as 5% $SiO_2$ may be used in making refractory molds, although the gels are weaker.

The preferred range of $SiO_2$ content in the aqueous silica sol is 15.2 to 16.5%.

In the manufacture of silica sols as herein described, it has been found that sols possessing the highest gel strength are produced when the evaporation is conducted as rapidly as possible. The higher the $SiO_2$ concentration of the cation exchanger effluent, the shorter will be the evaporation time required and the more useful will be the sol produced. The most easily handled starting sols (i. e., sols just prior to evaporation) are those having about a 3.5% $SiO_2$ concentration, but sols having a somewhat higher concentration, e. g., 4.5% $SiO_2$, are capable of being evaporated without premature gelation occurring.

The relatively viscosity of the finished sols at 77° F. is preferably 1.5 to 3 centipoises and the methyl orange alkalinity is preferably 107 to 117 grains per gallon, expressed as $CaCO_3$.

Typical silica sol compositions prepared in accordance with the invention illustrating compositions containing the approximate minimum and the approximate maximum ratios of $SiO_2:Na_2O$ are as follows:

Composition A:
Alkali metal oxide including $NH_4OH$, expressed as $SiO_2:Na_2O$ _____ 161:1
Percent $SiO_2$ _____ 16.8
Specific gravity at 68° F _____ 1.102

Composition B:
Alkali metal oxide including $NH_4OH$, expressed as $SiO_2:Na_2O$ _____ 330:1
Percent $SiO_2$ _____ 17.2
Specific gravity at 68° F _____ 1.109

The invention will be further illustrated but is not limited by the following examples in which the methyl orange alkalinity is given in grains per gallon, expressed as $CaCO_3$, and the pH measurements were made with Hydrion pH paper No. 358.

EXAMPLE I

A silica sol was prepared by passing an aqueous sodium silicate solution having a specific gravity of 1.045 at 68° F. and containing 4.0% $SiO_2$ through a column of a polystyrene divinylbenzene sulfonic acid cation exchange resin (Nalcite HCR) and the effluent having a specific gravity of 1.026 at 68° F., an $SiO_2$ content of 4.5%, a pH of 3.7, and a conductivity of 800 micromhos, had ammonium hydroxide added thereto until the pH was adjusted to 9.1. Eighty-five (85) gallons of ammonium hydroxide adjusted silica sol produced from the said ion exchange operation were placed in a 150 gallon steam kettle and the temperature was raised until the liquid began to boil. At this point additional ammonium hydroxide adjusted ion exchanger effluent sol was added to maintain the volume in the kettle constant and enough potassium hydroxide was added as was indicated from previous experience to have a pH of 8.5 at the end of the concentration. The evaporation concentration process continued for 8 hours. During the first few hours it was necessary to add ammonium hydroxide to the boiling sol to maintain the pH at 9. Near the end of the process the pH was gradually allowed to fall to be at 8.5 at the end. The total amount of potassium hydroxide added during the process was equal to 9.2 grams per gallon of produced sol. Throughout the process described specific gravities were constantly checked and the highest point ever reached was 1.115. After the concentration had stopped, 10% by volume of Chicago tap water was added to adjust the gravity to 1.111.

The finished sol had the following properties:

Conductivity in micromhos _____ 2,200
pH _____ 8.5
Percent $SiO_2$ _____ 16.5
Specific gravity at 68° F _____ 1.111
Relative viscosity at 77° F. (centipoise) _____ 2.0
Methyl orange alkalinity _____ 111

EXAMPLE II

A second batch of sol was produced using the procedure shown in Example I except that 8.6 grams of potassium hydroxide were added per gallon of produced sol. The produced sol had the properties listed below:

Conductivity in micromhos _____ 2,400
pH _____ 8.5
Percent $SiO_2$ _____ 16.3
Specific gravity at 68° F _____ 1.110
Relative viscosity at 77° F. (centipoise) _____ 3.0
Methyl orange alkalinity _____ 110

EXAMPLE III

Another sol was produced in accordance with the general procedure of Example I and had the following properties:

| | |
|---|---|
| Conductivity in micromhos | 2,300 |
| pH | 8.5 |
| Percent $SiO_2$ | 15.2 |
| Specific gravity at 68° F | 1.10 |
| Relative viscosity at 77° F. (centipoise) | 2.0 |
| Methyl orange alkalinity | 110 |

The sols produced in accordance with the invention are capable of forming gels by the addition of electrolytes thereto. The types of electrolytes that can be used in causing the gelation of these sols are many and varied. They include inorganic ionizable salts such as sodium chloride, sodium sulfate, potassium chloride, potassium sulfate, and other alkali and alkaline earth metal salts, inorganic acids such as hydrochloric acid and sulfuric acid, aqueous solutions of low molecular weight organic acids, e. g., acetic acid and citric acid, alcohols, glycols and other water soluble organic materials which are sufficiently polar in nature to cause gelation of these sols.

In the making of refractory casting molds, the mold materials are usually referred to as refractories or as mold materials and are generally composed of silica plus a grog which is a dead burned, ground up fire brick material. Some of the materials used are sand, bentonite, kaolin, mellite, sillimanite and bauxite. In general, the preferred ceramic particles which are bound together with a silica sol in accordance with the invention can be classified as silicas, zirconias, magnesias and aluminas. Usually, the mold materials are not composed of any one of the above ingredients but are a mixture of several types of ingredients blended in varying proportions which are dependent upon the type of molding operation to be conducted. A typical refractory used for molding steel consists of a minor proportion of silica flour and silica sand uniformly mixed with a major proportion of grog. In the practice of the present invention the best results are obtained when molding materials having silicates or a form thereof present as their chief ingredient are used.

Usual foundry practice is to mix the refractory material with a liquid vehicle until a slurry of cement consistency has been formed and to pour this mixture into the mold which contains the pattern to be cast. The mold is then tamped or vibrated until the refractory molding material is packed down into a solid uniform mass. The molds, after the packing operation, are allowed to stand for a period of time to allow them to set up or gel. If the vehicle and binder used sets up either too rapidly or too slowly, the production schedules will be hampered, and if such setting up periods are too erratic, many molds are rendered useless.

The formation of gels is dependent upon numerous factors which must be taken into consideration if proper controllable gels are to be formed when high gel strength sols are to be used as binders for refractory melting materials. As a general rule the gels will form most rapidly at elevated temperatures. In foundry practice, particularly in the precision investment casting industry, the molding is done at temperatures between about 70 to 90° F. The gel rate and the strength of the gel is critically dependent upon the type of electrolyte used as gel accelerator as well as the amount thereof. As a general rule, strong electrolytes should be used in smaller amounts than weak electrolytes. If excess accelerator is used, the gelation will occur too rapidly and as a result the gels formed are not usable. In the practice of this invention, it has been found that excellent results have been obtained by using such electrolytes as Epsom salts, which is known chemically as magnesium sulfate, citric acid, magnesium silico-fluoride, and disodiumdihydrogen pyrophosphate.

In order to illustrate the controllability of the gels formed from sols made in accordance with the present invention various mixtures of the sol disclosed in Example I were made with two different electrolytes and the gelation time was measured with the results shown in the following table.

Table

| Time to Gel in Min. | Grams $MgSO_4 \cdot 7H_2O$ per 100 ml. of Sol | | | | Grams of $MgSiF_6 \cdot 6H_2O$ per liter of Sol | |
|---|---|---|---|---|---|---|
| | at 80° F. | at 68° F. | Diluted ½ Vol. with Chicago Tap Water at 68° F. | Diluted with 60% by Vol. Chicago Tap Water at 80° F. | at 80° F. | at 68° F. |
| 15 | 1.75 | | | | | |
| 20 | 1.35 | | | | | |
| 30 | 1.03 | 1.85 | | | | |
| 40 | .7 | 1.35 | | | | |
| 50 | | 1.15 | | 6.5 | | |
| 60 | | 1.02 | 2.0 | 3.5 | | |
| 70 | | .95 | 1.6 | 2.0 | | |
| 80 | | .70 | 1.4 | 1.3 | | |
| 90 | | | 1.28 | .8 | 1.75 | |
| 100 | | | 1.18 | | 1.98 | |
| 120 | | | 1.05 | | | |
| 140 | | | .97 | | | 1.4 |
| 160 | | | .7 | | | |
| 180 | | | .5 | | | 1.6 |
| 200 | | | | | | 1.8 |

In actual foundry practice the gel time can be readily ascertained by simple routine experiment. The usual procedure is to test several samples of a sol with various electrolytes and concentrations thereof at the temperatures normally used in the foundry operation. By plotting the gel times against concentration of a given electrolyte at specific temperatures graphs are obtained which may be employed in commercial operations.

While the silica sol liquid vehicles and binders prepared in accordance with the invention can be used in all types of operations where it is desired to bond refractory type materials, the invention is especially useful in the making of molds for precision investment casting.

Precision investment casting, sometimes known simply as investment casting, is commonly known to the art as casting by the "lost wax method." This process utilizes a soft melting disposable form which is placed in a flask and is surrounded by molding material. After the mold has obtained green or gel strength, the mold is fired, as in the case of pattern wax at about 350° F. The wax is removed by melting out from the mold. The wax or other expendable pattern material exhibits its greatest force against the mold at its softening point which is about below the boiling point of water. If the mold is not of sufficient green strength small fissures or cracks, some of which are microscopic in size, are formed in the mold cavity and the resulting cast object will be defective.

The application of the invention to the manufacture of refractory casting molds is illustrated by the following additional examples.

EXAMPLE IV 6900 cc. of the silica sol shown in Example III, having dissolved therein 27.6 grams of technical grade magnesium silicofluoride, were mixed with 50 to 60 pounds of an investment refractory molding material consisting primarily of ground fire brick refractory with minor amounts of silica flour and sand. The ingredients were uniformly mixed until a smooth cementitious-like slurry was obtained. This was poured into a paper topped metal flask containing a wax pattern and vibrated on a mechanical vibrator until the mold had packed down hard. The entire process thus far described had taken about 30 minutes and the temperature of the slurry was about 70° F. Thirty minutes later the mold had gelled and possessed substantial green strength. The mold was allowed to stand over night and the following morning the base plate was removed from the flask. The paper top containing the denser refractory particles was shaved from the flask and the flask containing the mold was placed in a dewaxing oven and fired at 350° F. for about 2½ hours at which time substantially all of the wax had melted out. The mold was removed and placed in a decarburizing furnace which was fired to 1800° F. for about 4 hours, at which time the mold was removed and steel poured.

Throughout the entire process there were no defects in the mold and once it had gelled it could be handled without danger of cracking or breaking. The castings produced were suitable and no hair line cracks or rough spots were apparent. The gel time of the silica sol was of sufficient duration to give the operator ample time to work the mold without fear of gelation yet the mold was set within a reasonable period of time.

EXAMPLE V

The procedure of Example IV was followed except that 48 grams of magnesium sulfate ($MgSO_4 \cdot 7H_2O$) was used as a gel accelerator and the mold gelled in 60 minutes from the time of the mixing of the mold ingredients. Essentially the same results were obtained.

EXAMPLE VI

The mold refractory material used was the same as in Example IV. 41 grams of magnesium sulfate ($MgSO_4 \cdot 7H_2O$) were dissolved in 2700 cc. of the silica sol shown in Example III. The temperature of this sol solution was 84° F. 23 pounds of the refractory were added to the magnesium sulfate treated sol and thoroughly blended until a cementitious-like slurry was obtained. The mold slurry was poured into a flask containing a polystyrene pattern with wax gating and was vibrated on a vibrating machine until the mold was packed solid. This much of the operation was complete in about 13 minutes. The mold gelled in 31 minutes and was capable of normal handling. About 12 hours later the mold was fired at 1800° F. for 4 hours and steel was poured at the end of the firing period. The casting produced was of excellent quality.

In addition to having use for applications of the type described above, the aqueous silica sol vehicles and binders may be used as dip coats for certain type patterns used in investment casting. They may also be used either with or without gel promoting electrolytes.

The vehicles and binders used in this invention are capable of storage for periods up to about 2 months. At this time they may become viscous and will, upon long periods of standing, tend to gel. Minor amounts of alcohol and glycol antifreeze liquids may be incorporated with the silica sols provided they are made slightly acidic in pH. When such antifreezes are used, the storage length of these sols is greatly diminished.

In using the sols above described, particularly where the dip coat process is contemplated, it is sometimes desirable to incorporate in the sol minor amounts of wetting agents and sometimes minor amounts of certain higher alcohols, e. g., n-octyl alcohol, which are useful in preventing any foaming that might occur in the mixing operation.

As a basis of comparison gels were formed with various commercially available silica sol materials. It was found that gels produced were substantially inferior to those formed by the sols used for the purpose of the present invention. One commercial sol containing about 30% $SiO_2$ was diluted down to a $SiO_2$ concentration of about 16.5% and a small amount of Epsom salts were added thereto. The resultant gel took an exceptionally long time to form and was soft and deemed to be impractical for use as a vehicle and binder for refractory type casting molds.

While the invention is not limited to any theory, it is believed that the sols prepared and used in accordance with this invention have unusually high gel strength due to the nature and size of the $SiO_2$ particles present. The conductivity of the sol appears to be a measure of the number and size of the sol particles. The higher the conductivity, the greater will be the number of particles present and the smaller will be the size of such particles. It is believed that when gelation of these sols occurs a highly cross-linked matrix is formed, thereby imparting a high gel strength to the colloidal mass which was initially present. Sols having a large particle size contain relatively few particles in relation to the volume of the liquid in which they are contained. Gels formed with these sols are soft and mushy and leave much to be desired when employed as binders for refractory casting mold materials.

The invention is hereby claimed as follows:

1. A process of binding particles of a ceramic material together which consists essentially in mixing particles of a ceramic material with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.4 to 10, a relative viscosity, measured at 77° F., of about 1.5 to 3.0 centipoises, and a specific gravity of at least 1.047 at 68° F., adding to said mixture an amount of an electrolyte sufficient to produce uniform controlled gelation of the silica sol, setting up the resultant mixture and firing the resultant product.

2. A process of binding particles of a ceramic material together which consists essentially in mixing particles of a ceramic material with an aqueous silica sol having at least 5% $SiO_2$, a conductivity of from 1800 to 3200 micromhos, a weight ratio of $SiO_2$ to alkali metal oxide, calculated as $Na_2O$, within the range of 160:1 to 330:1, a pH of from 8.5 to 9.0, a relative viscosity, measured at 77° F., of about 1.5 to 3.0 centipoises, and a specific gravity of from 1.105 to 1.115 at 68° F., adding to said mixture an amount of an electrolyte sufficient to produce uniform controlled gelation of the silica sol, setting up the resultant mixture and firing the resultant product.

3. A process of forming a refractory casting mold which consists of slurrying the refractory material with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10.0, a relative viscosity, measured at 77° F., of about 1.5 to 3.0 centipoises, and a specific gravity of at least 1.07 at 68° F., adding to said slurry an amount of electrolyte sufficient to produce uniform controlled gelation of the silica sol, setting up the mold and firing said mold.

4. A process of forming a refractory casting mold which consists of slurrying refractory materials from the group consisting of silicas, zirconias, magnesias and aluminas, with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10, a relative viscosity, measured at 77° F., of about 1.5 to 3.0 centipoises, and a specific gravity of at least 1.07 at 68° F., adding to said slurry an amount of electrolyte from the group consisting of magnesium sulfate, magnesium silicofluoride, disodium dihydrogen pyrophosphate and citric acid, sufficient to produce uniform controlled gelation of the silica sol, setting up the mold and firing said mold.

5. A process of forming a refractory casting mold which consists of slurrying silica refractory materials with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10.0, a relative viscosity, measured at 77° F., of about 1.5 to 3.0 centipoises, and a specific gravity of at least 1.07 at 68° F., adding to said slurry an amount of electrolyte sufficient to produce uniform controlled gelation of the silica sol, setting up the mold and firing said mold.

6. A process of forming an investment refractory casting mold which consists of slurrying an investment refractory material with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10.0, a relative viscosity, measured at 77° F., of about 1.5 to 3.0 centipoises, and a specific gravity of at least 1.07 at 68° F., adding to said slurry an amount of electrolyte sufficient to produce uniform controlled gelation of the silica sol, setting up the mold and firing said mold.

7. A process of forming an investment refractory casting mold which consists of slurrying investment refractory materials with an aqueous silica sol having a $SiO_2$ content of 15.2 to 16.5%, a conductivity of about 2200 to 2400 micromhos, a weight ratio of $SiO_2$ to alkali metal oxide, calculated as $Na_2O$, within the range of 160:1 to 330:1, a pH of about 8.5, a specific gravity of about 1.10 to about 1.111 at 68° F., a methyl orange alkalinity of about 107 to 117 grains per gallon, expressed as $CaCO_3$, and a relative viscosity at 77° F. of 1.5 to 3 centipoises, adding to said slurry an amount of electrolyte sufficient to produce uniform controlled gelation of the silica sol, setting up the mold and firing said mold.

8. A composition for making a refractory mold consisting essentially of particles of a refractory material mixed with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10, a relative viscosity, measured at 77° F., of about 1.5 to 3.0 centipoises, and a specific gravity of at least 1.07 at 68° F.

9. A composition for making a refractory mold consisting essentially of particles of a refractory material from the group consisting of silicas, zirconias, magnesias and aluminas mixed with an aqueous silica sol having at least 5% $SiO_2$, a conductivity of at least 1800 micromhos, a weight ratio of $SiO_2$ to alkali metal oxide, calculated as $Na_2O$, within the range of 160:1 to 330:1, a pH of from 8.5 to 10, a relative viscosity, measured at 77° F., of about 1.5 to 3.0 centipoises, and a specific gravity of at least 1.07 at 68° F.

10. A composition for making a refractory mold consisting essentially of particles of a refractory material mixed with an aqueous silica sol having at least 5% $SiO_2$, a conductivity of from 2000 to 3000 micromhos, a weight ratio of $SiO_2$ to alkali metal oxide, calculated as $Na_2O$, within the range of 160:1 to 330:1, a pH of from 8.5 to 9.0, a relative viscosity, measured at 77° F., of about 1.5 to 3.0 centipoises, and a specific gravity of from 1.105 to 1.115 at 68° F.

References Cited in the file of this patent

UNITED STATES PATENTS

| | | |
|---|---|---|
| 2,380,945 | Collins | Aug. 7, 1945 |
| 2,577,484 | Rule | Dec. 4, 1951 |
| 2,577,485 | Rule | Dec. 4, 1951 |
| 2,601,235 | Alexander | June 24, 1952 |
| 2,605,228 | Alexander et al. | July 29, 1952 |
| 2,650,200 | Iler et al. | Aug. 25, 1953 |
| 2,671,056 | Wolter | Mar. 2, 1954 |
| 2,750,345 | Alexander | June 12, 1956 |